Nov. 16, 1926.　　　1,607,200

C. F. KETTERING ET AL
FUEL SUPPLY SYSTEM
Filed April 20, 1923　　3 Sheets-Sheet 1

Witnesses
Wm. F. Pasco.
Geo. E. Pasco.

Inventors
Charles F. Kettering
Charles L. Lee
Francis D. Shenerty
By
Their Attorney Nov. 16, 1926. 1,607,200
C. F. KETTERING ET AL
FUEL SUPPLY SYSTEM
Filed April 20, 1923  3 Sheets-Sheet 2

Witnesses
Wm. T. Pasco
Geo. E. Pasco

Inventors
Charles F. Kettering
Charles L. Lee
Francis O. Hardesty
By
Their Attorney Nov. 16, 1926.

C. F. KETTERING ET AL

FUEL SUPPLY SYSTEM

Filed April 20, 1923    3 Sheets-Sheet 3

1,607,200

Witnesses
Wm. T. Pasco.
Geo. E. Pasco.

Inventors
Charles F. Kettering
and
Charles L. Lee
Francis O. Hardesty
By
Their Attorney Patented Nov. 16, 1926.

1,607,200

UNITED STATES PATENT OFFICE.

CHARLES F. KETTERING AND CHARLES L. LEE, OF DAYTON, OHIO, ASSIGNORS TO GENERAL MOTORS RESEARCH CORPORATION, OF DAYTON, OHIO, A CORPORATION OF DELAWARE.

FUEL-SUPPLY SYSTEM.

Application filed April 20, 1923. Serial No. 633,511.

The present invention relates to fuel supply systems for internal combustion engines and more particularly to such systems as are adapted to lift fuel from a low level supply tank to the float bowl of a carburetor.

Among the objects of the invention is a fuel lifting system which will be positively operated by the engine itself and furnish fuel to the engine as needed and only in the amount needed.

Another object is a positively driven fuel lifting device whose capacity is greater than is actually needed but which lifts only the amount of fuel being used.

Another object is a pump positively driven at a rate constant in its relation to engine speed but which automatically varies its delivery as the engine varies its requirements.

Another object of the invention is to provide a pump which shall be non-leaking, require no lubrication, and be constructed with the minimum number of moving parts.

Further objects and advantages of the present invention will be apparent from the following description, reference being had to the accompanying drawings, wherein preferred embodiments of the present invention are clearly shown.

The preferred form of pump as illustrated, consists of a casing or housing 20 divided into two chambers 21 and 22 by a partition 23. Chambers 21 and 22 are, respectively, a pump chamber and a pressure chamber.

Figure 10:
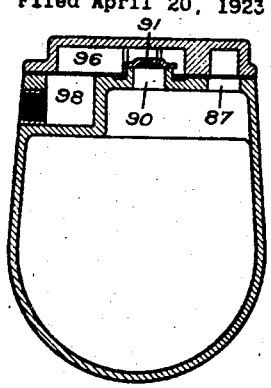
Fig. 10 is a section of the pump housing on line 10—10 of Fig. 12 but with the valve cover plate and valves in place.
Figure 11:
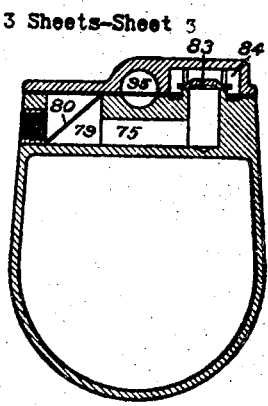
Fig. 11 is a similar view on line 11—11 of Fig. 12.

The casing 20 is preferably D-shaped in cross section, as is more clearly shown in Figs. 10 and 11 and is open at both ends. The flat side of the housing contains passages as hereinafter described and is provided with seats for valves to be referred to later.

The end of the casing containing chamber 21 is closed by means of a plate 30 having at its center an opening into which is swaged or otherwise secured a sleeve 31 carrying a bushing 32 forming a bearing for the pump shaft.

Figure 1:
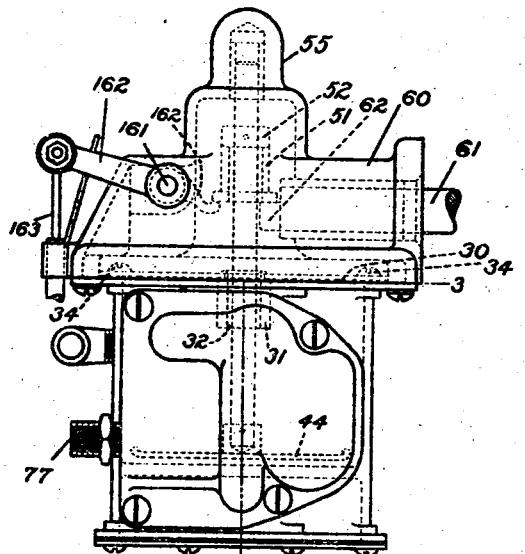
Fig. 1 is a plan view of the pump.

Plate 30 is also provided with a depressed portion 33, the purpose of which is explained later, and is secured to casing 20 by means of screws 34 as shown more clearly in Fig. 1.

Figure 15:
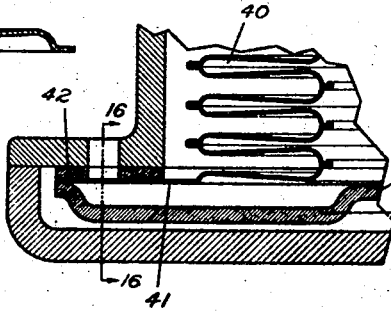
Fig. 15 is an enlargement of a portion of Fig. 3.
Figure 16:
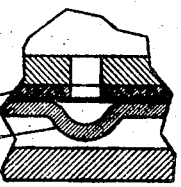
Fig. 16 is a section on line 16—16 of Fig. 15.

Within chamber 21 is located a metallic bellows 40. This element is of sufficient size to nearly fill chamber 21 and is constructed, as is more clearly indicated in Fig. 15, with one end flanged as at 41, the flange being wide enough to extend to the edge of plate 30 by which it is secured to casing 20 with the interposition of a suitable gasket 42. The bellows is closed at its free end by a plate 44 secured by soldering, brazing or in other suitable manner to make a liquid tight joint. Plate 44 is provided at its center, inside of the bellows, with a tubular boss 45 in which is secured, as by a pin 46, extending through the boss 45 and its end, a shaft 50 which is the pump shaft above referred to.

The shaft 50 extends from plate 44 through bushing 32 mounted in plate 30, and carries, revolubly mounted thereon beyond the latter, a tappet 51, limited in its outward endwise movement by a collar 52 fixed to shaft 50.

Secured also to the pump chamber end of casing 20 is a cover member 55. This member 55 completely encloses the end of shaft 50 projecting from plate 30 and provides a guide 56 for the end of the said shaft.

Cover member 55 is provided at one side with a flanged boss 60, in which is formed a bearing for a shaft 61, which is positively rotated by the engine and is in turn the driving means for the pump. Shaft 61 is provided at its pump end with an eccentrically located reduced portion 62 acting as a cam to lift tappet 51 and compress bellows 40. The flanges 62 serve to mount the pump upon the engine or other suitable base.

Chamber 22, the pressure chamber, also contains a bellows 65 of the same construction as bellows 40 but weaker in its elasticity. The bellows 65 is soldered, or otherwise secured with a liquid-tight joint, to a plate 66 closing the end of chamber 22, which plate is secured by means of suitable screws 67 to the casing 20 with the interposition of a suitable gasket 68. Plate 66 is provided at its central portion with an opening 69 to allow free ingress and egress of air.

As mentioned above, the flat side of the D-shaped casing 20 is provided with passages and valve seats as more clearly shown in Figs. 3 and 10 to 12. Of these passages, the one forming the inlet to the pump chamber 21 is designated by the numeral 75. This passage is threaded as at 76 for the reception of a suitable nipple 77 allowing connection with the main fuel tank, indicated at 78, Fig. 4. Passage 75 is also provided with a small chamber 79 in which is located a filter 80.

Figure 13:
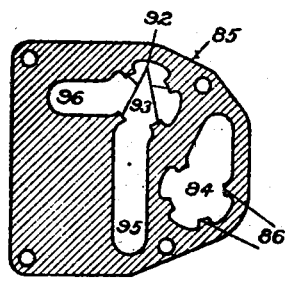
Fig. 13 is a sectional view of the valve cover plate taken on line 13—13 of Fig. 14.
Figure 14:
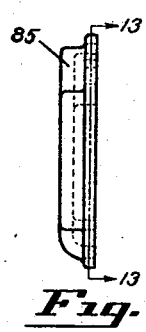
Fig. 14 is a side view of the valve cover plate.

The inlet passage 75 terminates in a valve seat for the valve 83 which is of the disc type and operates in a small chamber 84 formed in the valve cover 85 (see Figs. 13 and 14). Chamber 84 is provided with guide-ribs 86 for valve 83 and extends laterally over an opening 87 into pump chamber 21.

Figure 4:
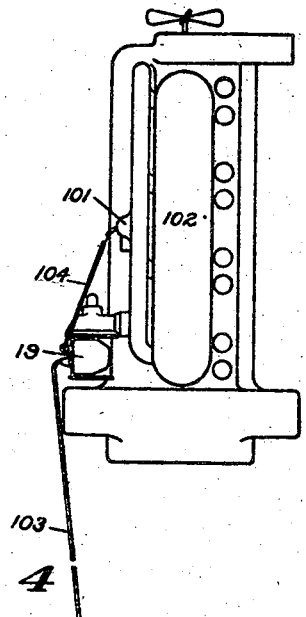
Fig. 4 is a plan view of an engine and fuel system indicating the preferred location of the pump.
Figure 2:
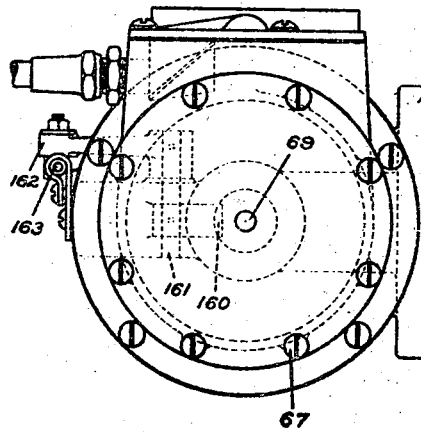
Fig. 2 is an elevation.
Figure 3:
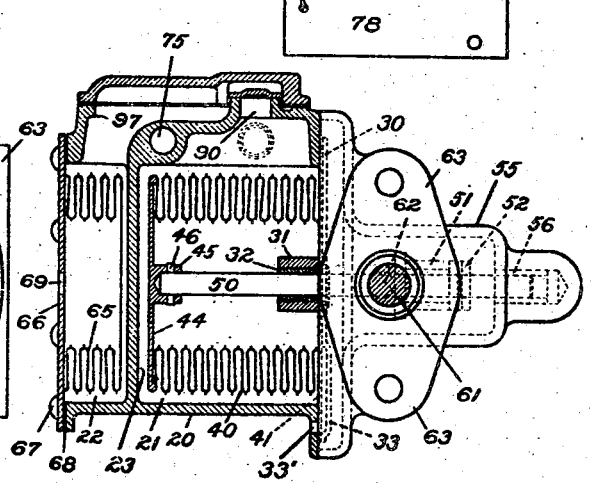
Fig. 3 is a section on line 3—3 of Fig. 1.

Chamber 21 is provided with a second or exit opening 90. This exit is formed into a seat for a second valve 91 also of the disc type. Valve 91 operates in guide ribs 92 in a second chamber 93 provided in valve cover 85 in the same manner as valve 83. Chamber 93 however is provided with two lateral extensions 95 and 96 leading, respectively, to passage 97, communicating with chamber 22, and passage 98 out of which is the discharge opening 99 provided with nipple 100 in similar manner to inlet 75, and from which a pipe leads to a carburetor 101 (Fig. 4).

Figure 9:
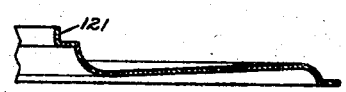
Fig. 9 is a similar view of another of the plates.
Figure 8:
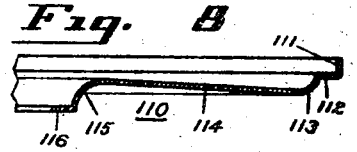
Fig. 8 is a part sectional view of one of the plates of the bellows.

The metallic bellows 40 and 65 which are as shown in the form of a tube with circumferential corrugations, are, as indicated in Figs. 7 to 9 and 15, constructed of a series of circular plates punched out and formed, as shown most clearly in Figs. 8 and 9, with central openings. Of these plates, it will be noted that one 110 (Fig 8) is provided with an upturned flange 111 at its edge surrounding a flat portion 112. Immediately inside of this flat portion 112, the plate 110 is curved downward forming an arc 113 somewhat over 90° of a circle and then is flattened as at 114 tangent to the arc. The flat portion extends inwardly to a point near the central portion of the plate where it is tangent to another curved portion 115 forming another arc of somewhat greater than 90° and curved in reverse direction to the first. The second curved portion terminates in a flat portion 116 in a plane parallel to that of 112 forming the edge of the central opening.

Plate 120 (Fig. 9) is formed in a similar but reverse manner to plate 110 except that this plate 120 has an inner upturned flange 121 instead of the outer one 111 as on plate 110.

Figure 7:
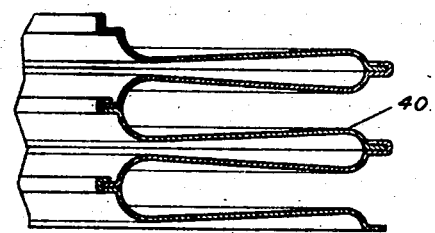
Fig. 7 is an enlarged sectional view of a portion of the bellows.

The bellows is made by stacking plates 110 and 120 alternately, the flange 111 fitting over the outer edge of plate 120 and the flange 121 extending through the central opening in plate 110, until the required length of bellows has been obtained, then spinning each flange over the adjacent flat edge of the next plate as shown clearly in Fig. 7, then soldering the several joints.

Of course each joint can be made and soldered separately but the preferred method is to apply a solder paste to the flanges during or before the stacking, then to spin over the flanges and, by heating the whole, solder all of the joints in one operation.

It should be noted that a bellows of the form shown has its convolutions so shaped that the inner edge curve 115 forming one half of the bottom of the groove of a corrugation has a longer radius than the outer edge curve 113 which forms one half of the ridge of a corrugation. The ratio of the radius of curve 113 to radius of curve 115 is substantially equal to the ratio of the diameter of the central opening to the diameter of the edge of the plate. These proportions enable the bending stresses occasioned by extension and compression of the bellows, to be distributed more largely upon the flat portions 114 of the plates than in similar known structures and consequently result in a longer life of the bellows. In other words arcs 113 and 115 are proportioned substantially to compensate for the difference in the amounts of metal in the two chief bending regions of the plates.

Figure 5:
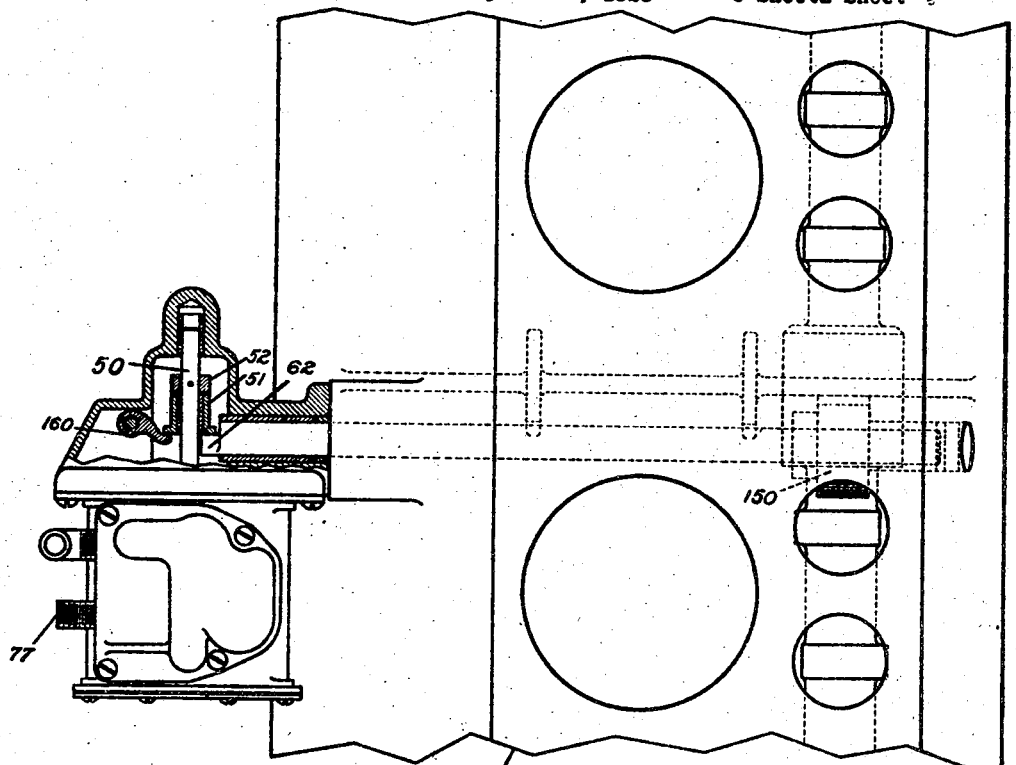
Fig. 5 is an enlargement of a portion of Fig. 4 showing part of the pump in section and showing more in detail the driving connection with the engine.
Figure 6:
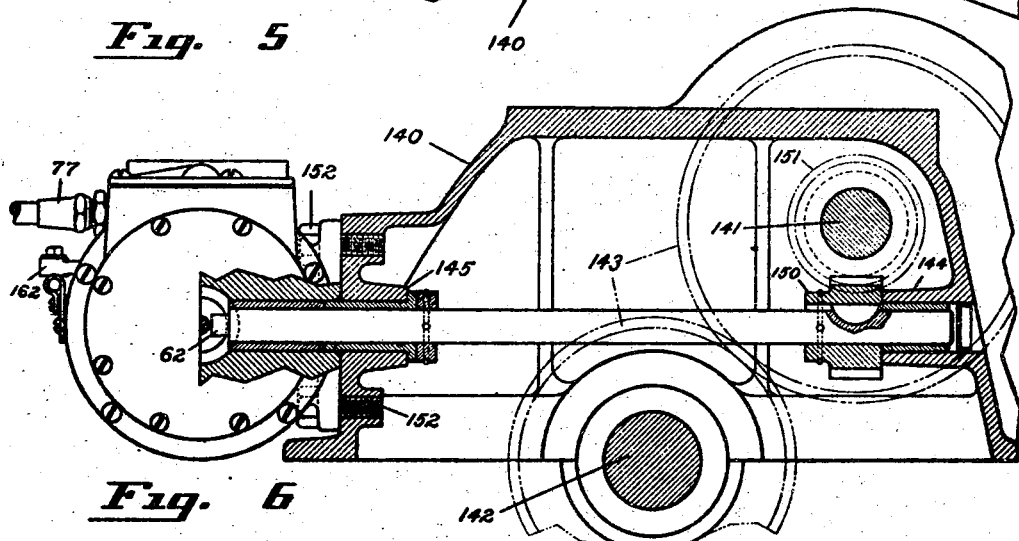
Fig. 6 is an end view of the mechanism shown in Fig. 5 with parts in section.
Figure 12:
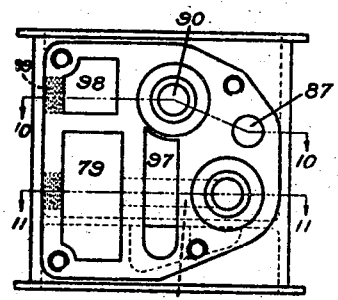
Fig. 12 is a plan view of the housing of Figs. 10 and 11 but without the cover plate and valves.

The pump may be mounted and driven as is indicated in Figs. 5 and 6. In these figures, the crank case of engine 102 is indicated at 140. Operating within the crank case in the usual manner is a cam shaft 141 driven from crank shaft 142 by gears 143. In the present instance the crank case 140 is provided with suitable bosses 144 and 145 in which are formed bearings for shaft 61 hereinbefore mentioned. Upon shaft 61 is mounted a worm gear 150 adapted to be driven by a worm 151 secured upon the cam shaft 141. Upon the outside of the crank case 140, adjacent boss 145, is machined a flat surface to which is secured the flanges 63 of the pump by means of screws 152. In starting the pump it is sometimes desirable to prime it in order that it may begin to deliver fuel immediately. This is accomplished by means of a small lever 160 mounted upon a shaft 161 extending through the wall of cover member 55. Upon the outer end of shaft 161 is another lever 162 to which is attached a wire 163 leading from the automobile instrument board or other suitable place. Lever 160 is so mounted that it is adapted to operate against the tappet 51 and so compress bellows 40. A few strokes of this lever is sufficient to fill the pump.

Free compression and expansion of bellows 40 is permitted by the provision of an air passage to the atmosphere. This air passage is through depression 33 in plate 30, which depression opens at one end inside of bellows 40 and at the other end outside the pump casing through an opening 33'. As shown in the drawing, Fig. 4, the present pump is shown used in conjunction with an ordinary carburetor designated by the numeral 101. This carburetor may be of the regular standard type, provided with a fuel bowl which includes a fuel level controlling member usually a float element associated with a cut-off valve through suitable operating leverage. This valve is adapted to shut off the inflow of fuel to the bowl when the fuel in said bowl reaches a predetermined level.

The pump is so constructed and adjusted that it can develop only a pressure less than the pressure exerted by the float through its leverage to maintain its valve in closed position when the fuel is at its high level. Therefore, when the float is at its high level and the valve accordingly closed, there is developed a back pressure against which the bellows will not expand and discharge further fuel into the bowl of the carburetor.

In operation, the cam 62 compresses the bellows and draws into chamber 21 a charge of fuel. If sufficient back pressure has not developed at the discharge outlet to prevent, the elasticity of the bellows 40 will, upon further movement of the cam, discharge the fuel through the outlet to the carburetor or into chamber 22 or both compressing the weaker bellows 65. If however, back pressure has built up at the discharge side, due to the fuel in the float bowl of the carburetor having reached its predetermined highest level, the bellows 40 will remain compressed or discharge a part of the fuel into chamber 22. Continued operation of cam 62, when the pump cannot discharge results in little or no movement of the bellows, the charge being merely retained in the pump chambers. Chamber 22 is used as a pressure equalizing chamber to furnish a more steady discharge of fuel and is desirable when the pump is applied to engines of 200 cubic inches displacement or larger. It may be omitted if desired.

In Fig. 4 is shown diagrammatically the fuel system. As shown, the fuel tank is indicated at 78, the pump at 19, and the carburetor at 101, attached to engine 102, suitable pipes 103 and 104 connecting the pump and tank and the pump and carburetor respectively.

While the forms of embodiment of the invention as herein disclosed, constitute preferred forms, it is to be understood that other forms might be adopted, all coming within the scope of the claims which follow.

What we claim is as follows:

1. A pump, comprising in combination, a housing including an intake chamber and an open-end exhaust chamber; valve mechanisms in said chambers; a displacement member in said intake chamber; and a cover plate supporting a pressure-equalizing element adapted to be secured to the housing at the open end of the exhaust chamber so that the equalizing element will be held in position in this enclosed exhaust chamber.

2. A pump comprising a substantially D-shaped casing horizontally arranged with the flat side uppermost; a pump chamber in one end of the casing; a pressure chamber in the other end, the two chambers being separated by an integral partition; inlet and outlet passages formed in the flat upper wall of the casing; disc valves for said passages having seats substantially flush with the outer surface of the said flat wall; and a cover member for the valves containing portions of said passages, the said portions of the outlet passage arranged to direct fluid to either the exit from the pump or to the pressure chamber or both.

In testimony whereof we hereto affix our signatures.

CHARLES F. KETTERING.
CHARLES L. LEE.